(No Model.) 5 Sheets—Sheet 2.

H. TABOR.
VALVE SYSTEM FOR AIR BRAKES.

No. 551,416. Patented Dec. 17, 1895.

Witnesses
Chas. Hanimann,
E. MacEntee

Inventor
Harris Tabor
By his Attorney
Chas. W. Forbes (No Model.) 5 Sheets—Sheet 3.
H. TABOR.
VALVE SYSTEM FOR AIR BRAKES.
No. 551,416. Patented Dec. 17, 1895.
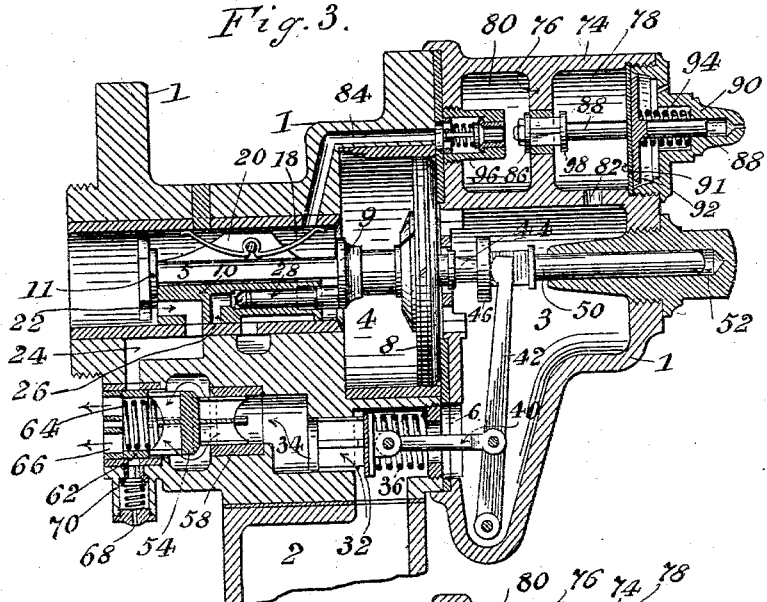
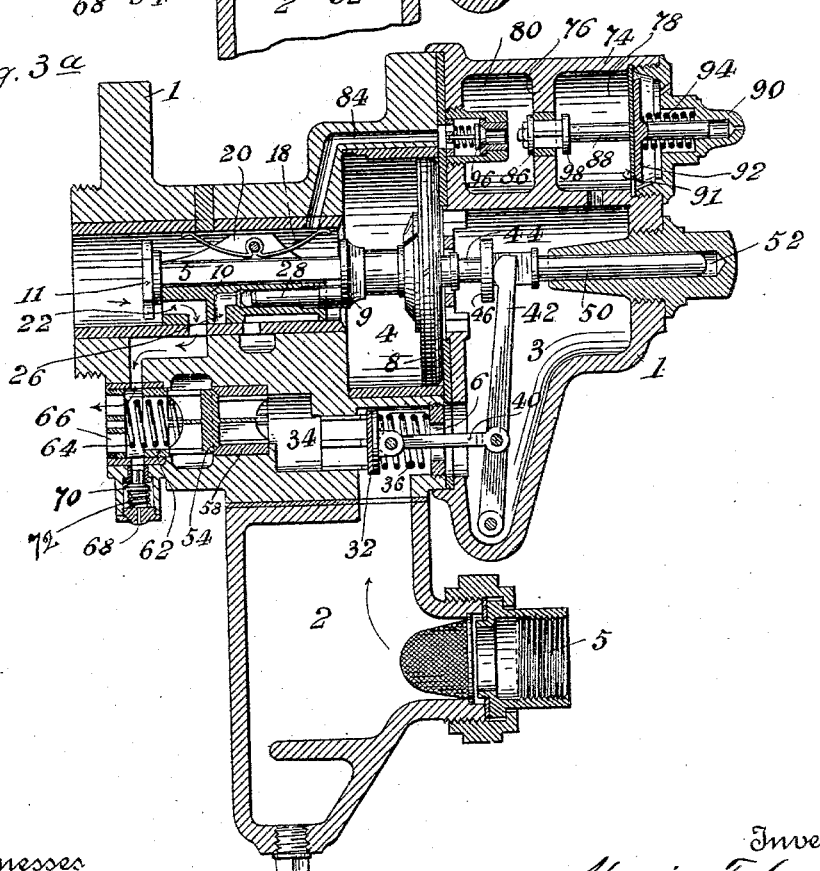
Witnesses
Chas. Hanimann.
E. MacEntee.
Inventor
Harris Tabor
By his Attorney
Chas. W. Forbes (No Model.)  5 Sheets—Sheet 4.
H. TABOR.
VALVE SYSTEM FOR AIR BRAKES.

No. 551,416.  Patented Dec. 17, 1895.

Witnesses
Chas Hanimann,
E. Mac Entee

Inventor
Harris Tabor
By his Attorney
Chas N. Corben

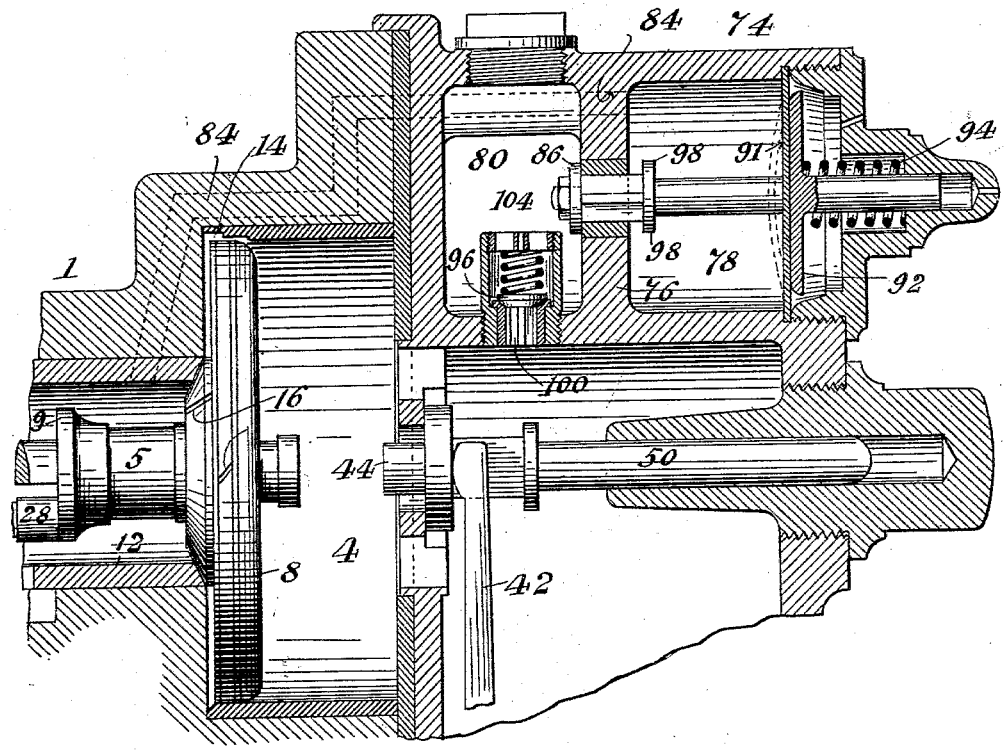

UNITED STATES PATENT OFFICE.

HARRIS TABOR, OF ELIZABETH, NEW JERSEY.

VALVE SYSTEM FOR AIR-BRAKES.

SPECIFICATION forming part of Letters Patent No. 551,416, dated December 17, 1895.

Application filed March 3, 1893. Serial No. 464,496. (No model.)

*To all whom it may concern:*

Be it known that I, HARRIS TABOR, a citizen of the United States, residing at Elizabeth, in the county of Union and State of New Jersey, have invented certain new and useful Improvements in Valve Systems for Air-Brakes, of which the following is a specification.

This invention relates to automatic pressure-brakes wherein air-pressure from the auxiliary reservoir to the brake-cylinder is applied for service stops, and direct air-pressure from the train-pipe to the brake-cylinder is applied for emergency stops through an automatic system of valves.

The invention will first be described and its novel characteristics subsequently pointed out in the claims.

Figure 1:
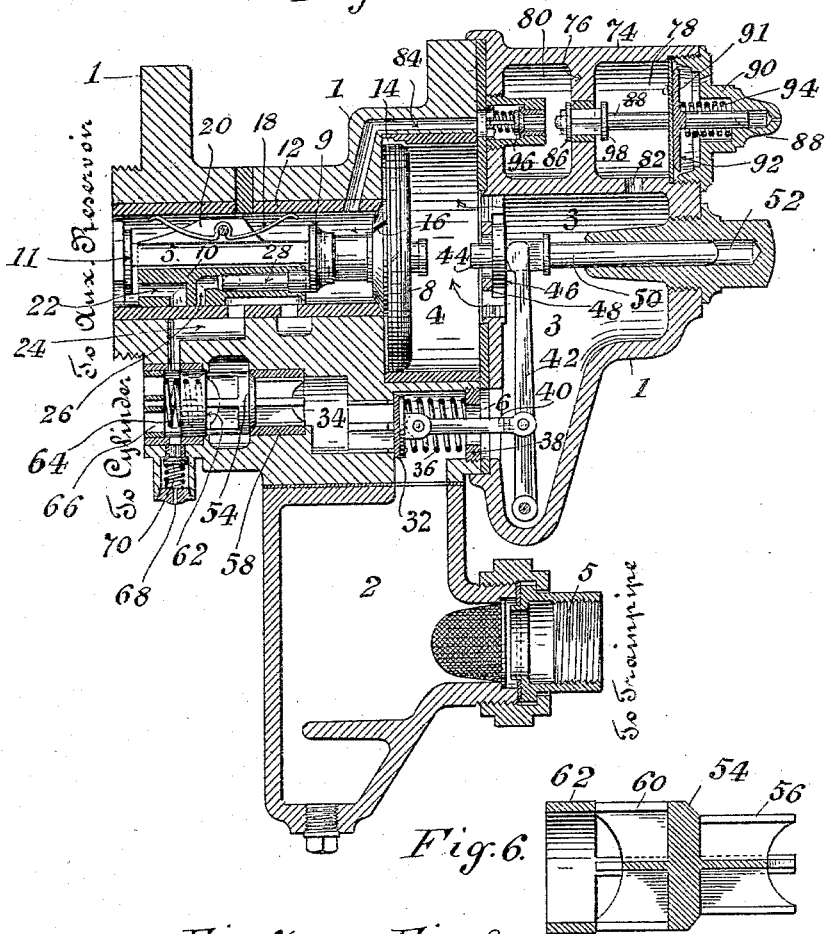
Figure 2:
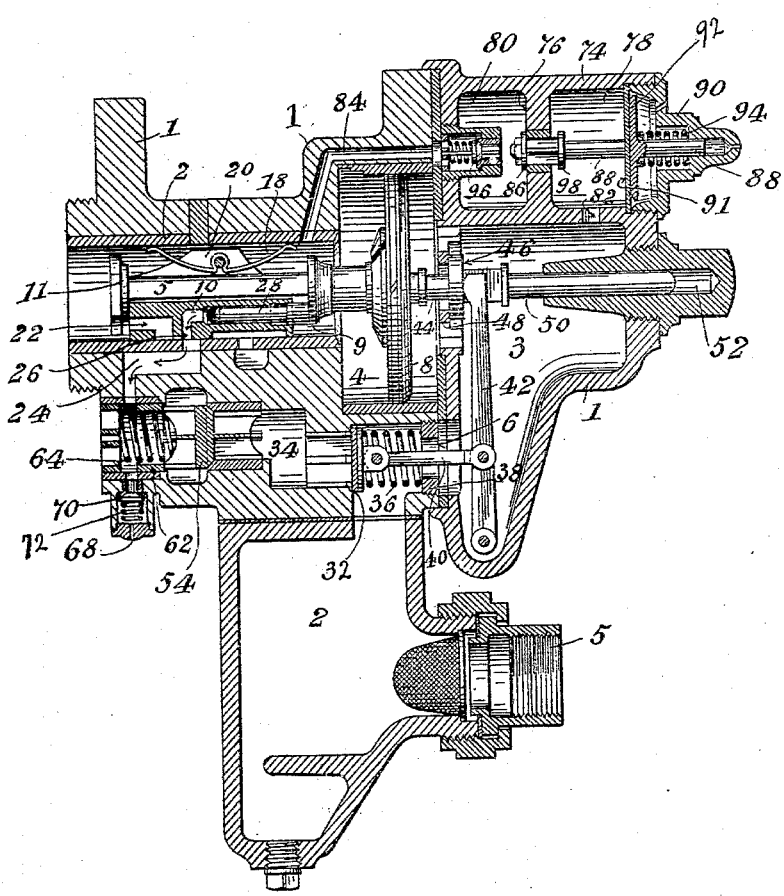
Figure 4:
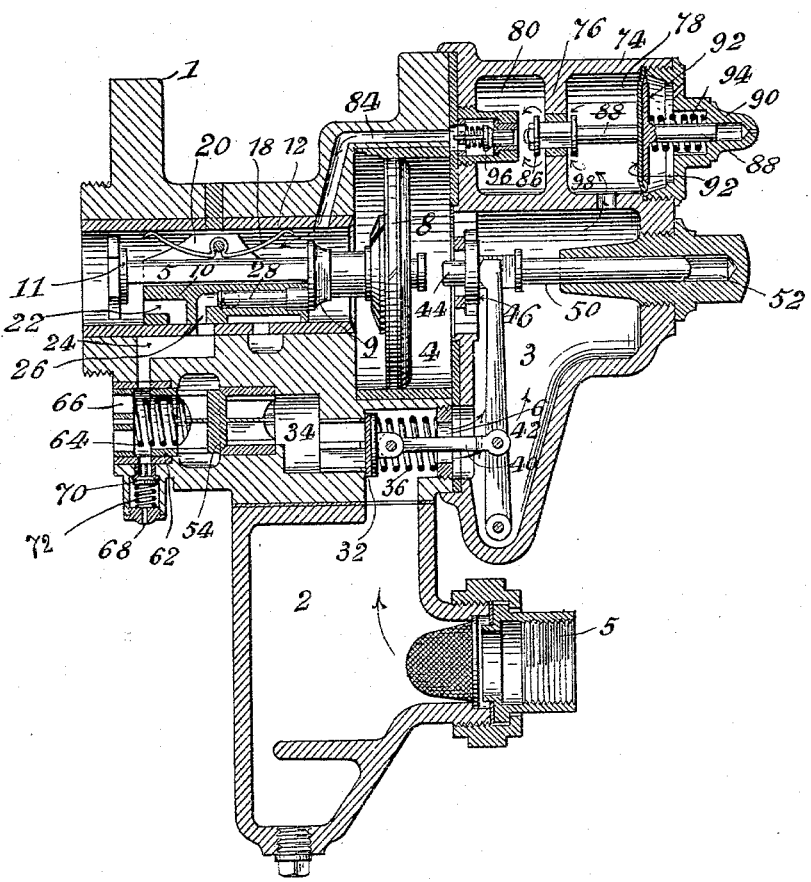

In the accompanying drawings, Figure 1 is a longitudinal section of an apparatus, showing a valve system embodying my invention; Fig. 2, a similar view showing the parts in position for service stops. Figs. 3 and 3ª are similar views showing the parts in position for emergency stops; Fig. 4, a similar view showing the parts in position for recharging the auxiliary reservoir while the brakes are set; Fig. 5, a longitudinal section of a portion of the apparatus shown in Fig. 1, but showing a modification of the double charging-valve; Fig. 6, a section on an enlarged scale of the check-valve located in the passage between the emergency-valve and the brake-cylinder; Fig. 7, a cross-section on the line *x x* of Fig. 1, enlarged; and Fig. 8 a longitudinal section of the parts shown in Fig. 7, also enlarged.

Referring by characters of reference to the drawings, 1 designates the valve-casing, comprising a chamber 2, a chamber 3, and a chamber 4. A train-pipe of the usual construction communicates with the chamber 2 through the connection 5, and the chamber 2 communicates with the chamber 3 through the opening 6. The chamber 3 communicates with the chamber 4 through the openings, as indicated by the arrows.

8 indicates the valve-piston, movable in the cylinder 4, and having a stem 5 engaging the sliding valve 10, movable in a cylinder 12, which communicates with an auxiliary reservoir of the ordinary construction on the car, and which it is not deemed necessary to illustrate. The normal position of the piston 8 is that, as shown in Fig. 1, as closed against the inner end of the cylinder 12. The air-pressure, while the brakes are not set, is continuous from the chamber 4 to the auxiliary reservoir, the passage being through the ports 14 and 16, and through the valve-cylinder 12. When the brakes are applied, however, the communication between the train-pipe and auxiliary reservoir is cut off by a movement of the piston 8 into the cylinder 4, as in Fig. 2. The piston 8 thus acts as a cut-off valve in the usual manner, when retracted, as in Figs. 2, 3, 3ª and 4, from its normal position shown in Fig. 1.

The slide-valve 10 is seated in a longitudinal channel in the wall of the cylinder 12, and is movable therein. It is retarded with frictional pressure upon its seat by means of a spring 18, mounted on a transverse bar extending between the flanges 20, projecting from the slide-valve, and bearing against the wall of the cylinder 12, opposite the channel. The slide-valve is provided with a port 22, receiving air from the auxiliary reservoir, adapted to communicate with a port 24, leading to the brake-cylinder, when at the position shown in Fig. 3. The slide-valve is also provided with a port 26, having a side opening, as seen in Figs. 7 and 8, for receiving air from the auxiliary reservoir and adapted to communicate with the port 24 when at the position indicated in Fig. 2. The port 26 has a reduced area relatively to the port 22, for a purpose which will hereinafter appear. The communication of the port 26 with the interior of the cylinder 12 and the auxiliary reservoir is controlled by a plug-valve or graduating-valve 28, carried by the piston 8.

The stem of the valve-piston 8 bears collars 9 11, slightly farther apart than the length of the slide-valve 10, so that the piston may have a slight movement before imparting motion to the slide-valve. The plug-valve or graduating-valve 28 being mounted on a projection or shoulder 9 of the stem of the piston and movable across the inlet of the port 26, it will be seen that a slight movement of the piston relatively to the slide-valve will operate to open or close the port 26.

In existing systems of air-brakes the direct air or emergency relief-valve opens simultaneously with the full admission of air from the auxiliary reservoir to the brake-cylinder. As a result of this simultaneous action, the admission-port from the reservoir to the cylinder must be small, or the opening through the relief-valve large. Otherwise, so much air would pass from the reservoir to the brake-cylinder that it would check the flow of air from the train-pipe to the brake-cylinder, and thus render the application of brakes too slow for emergency stops. To remedy the said defects I employ a construction as follows:

32 is what I term a "quick-action" valve, controlling a direct air-passage 34 between the train-pipe and the brake-cylinder. This valve 32 is normally seated against the outer end of the passage 34, and is held to its seat by a resistance imparted, as here shown, by means of a spring 36, abutting at one end against the valve 32, and at the other end against a ring or collar 38, fixed in a portion of the casing 1 between the chambers 2 3. A link 40 is pivotally connected at one end to the valve 32, and at the opposite end to a fulcrumed lever 42 within the chamber 3. The free end of the lever 42 engages with the stem of a stop 44. This stop 44 is movable longitudinally. It has an annular collar 46, normally abutting against a spider 48, arranged between the chambers 3 4. A stem 50 extends from the stop 44 into a socket 52, supported by the casing 1. By this construction it will be seen that the stop 44 is forced toward the piston 8 by means of the spring 36, and that the stop will serve to open the valve 32 against the resistance of the spring 36, when the piston is forced against the stop.

It is to be understood that within the meaning of the present invention the means for mechanically imparting motion from the piston 8 to the valve 32 may be variously modified.

54 designates a combined check and cut-off valve located in the passage 34, between the valve 32 and the brake-cylinder. This check-valve 54, when closed, serves the function of a valve to prevent the flow of air from the brake-cylinder to the train-pipe, and when open to shut off the flow of air through the port 24 from the auxiliary reservoir to the brake-cylinder until the pressure in the brake-cylinder has nearly equaled the pressure in the train-pipe. The construction of the valve 54, whereby this result is obtained, is as follows: A skeleton frame comprising arms or wings 56 extends rearward from the valve and forms a guide or support for the valve. This skeleton frame is movable in a boxing or seat 58, fixed in the passage 34. A similar skeleton frame 60 extends forward from the valve 54 and carries a cut-off valve for the port 24. This cut-off valve, as here shown, consists of a ring or collar 62, having sufficient width to close the port 24. The valve 54 has a resistance or returning device, here shown as consisting of a spring 64, abutting at one end against the skeleton frame 60 and at the opposite end against a spider 66, seated in the passage 34, as shown.

In the operation of the apparatus thus far described the pressure in the train-pipe is controlled from the engine in the usual manner.

In setting the brakes for the common or ordinary stops of a train the air-pressure in the train-pipe is reduced gradually, allowing the piston 8 to retract by the back-pressure in the auxiliary reservoir to the position shown in Fig. 2 until the reduced port 26 communicates with port 24, admitting a gradual charge of air to the brake-cylinder. For quick or emergency stops, the pressure in the train-pipe being abruptly or greatly reduced, pressure in the auxiliary reservoir forces the piston 8 against the stop 44, as in Fig. 3, with sufficient energy to compress the spring 36 and open the quick-action valve 32, which allows the pressure of air in the train-pipe to open the valve 54 and discharge directly into the brake-cylinder, and at the same time the cut-off valve 62 will close the port 24, leading from the auxiliary reservoir to the brake-cylinder, thus preventing any obstructive counter-current of air from the auxiliary reservoir. After the quick-action valve 32 admits part of the train-pipe air and pressure to the brake-cylinder, the valve 62 will return and thereby open the port 24, communicating with the port 22, and cause a quick flow of air from the reservoir to the brake-cylinder, applying full pressure to hold the brakes hard on.

Charging the auxiliary reservoir when the brakes are set has ordinarily been done with the aid of an additional pipe leading from the locomotive to the auxiliary reservoir. In practice this extra pipe has been found objectionable on account of leakage owing to multiplied couplings, expense, and the danger of the engineer using the wrong pipe in case of emergency. Attempts have also been made to produce the same result by the employment of a secondary feed-passage between the train-pipe and auxiliary reservoir provided with a valve to admit a flow of air from the train-pipe to the auxiliary reservoir, when the brakes are applied. In these instances the valve is actuated by the motion of the triple valve, and no practical provision is made for releasing the brakes. In the latter case it will be readily seen that before the brakes can be released the equality of pressure in the train-pipe and auxiliary reservoir must be broken by the increase of train-pipe pressure over reservoir-pressures sufficient to overcome the friction of the triple slide-valve, and this cannot be accomplished while the feeding-port from the train-pipe to the auxiliary reservoir remains open. This circumstance with a train of fifty cars would leave fifty ports open coincidently, and consequently the air-pump or air-supply could not produce sufficient current to effect a release.

My invention overcomes this difficulty in the novel construction of the valve, and by actuating it by a graduated spring or equivalent means through the medium of the train-pipe or auxiliary-reservoir pressure, whereby the valve is operated between predetermined limits of pressure.

In Figs. 1, 2, 3, 3ª, and 4 I have shown a valve mechanism for this purpose, operated by fluctuations of pressure in the train-pipe, and in Fig. 5 I have shown the valve mechanism as operated by fluctuations of pressure in the auxiliary reservoir. In both examples it will be understood that the valve mechanism is automatically operated by air-pressure.

Referring first to Figs. 1, 2, 3, 3ª and 4, 74 designates a cylinder having a transverse partition 76, dividing the cylinder into chambers 78, 80, communicating one with the other through an opening in the partition 76, controlled by a double-seated valve 86 98. The chamber 78 in this example communicates with the train-pipe through a port 82, opening into the chamber 3, and the chamber 80 communicates with the auxiliary reservoir through a secondary feed-passage 84, leading from said chamber into the cylinder 12. The secondary feed-passage 84 has a check-valve 96 for preventing return of back-pressure from the auxiliary reservoir to the train-pipe. The double valve 86 98 has a stem 88, extended through the chamber 78 into a socket formed in the head 90 of the cylinder 74. The stem 88 extends through a flexible diaphragm 91, fixed at its edges within the chamber 78, and rearward of this diaphragm the stem has affixed to it an annular shoulder or plate 92. A spring 94, coiled around the stem 88, abuts at one end against the shoulder or plate 92, and at the other end against a portion of the head 90. In this example the resistance of the diaphragm 91, caused by the spring 94, is adjusted to a desired or normal air-pressure. When the air-pressure in the train-pipe is above a given point, say fifty-five pounds, it will have a force against the diaphragm greater than its resistance, and the disk 86 of the double valve will close the passage. When the said air-pressure falls below the said given point, the greater force exerted by the spring 94 will cause the valve-disk 86 to open and allow air to flow from the train-pipe into the chamber 80, thence, by opening the valve 96, through the secondary passage 84 into the auxiliary reservoir. A further reduction of the pressure in the train-pipe, say to forty-five pounds, will permit a further expansion of the spring 94 to move the valve-stem 88 until the disk 98 of the double valve on said valve-stem closes the opening through the partition 76 on the side opposite that of the disk 86. The spring holding the disk 96 to its seat should be of such tension that it will hold the valve closed when a slightly-increased pressure in the train-pipe over that in the auxiliary reservoir closes the plug or graduating-valve 28, as in Fig. 4, to isolate the air in the brake-cylinder, and it will also allow the valve to open under the increased pressure necessary to release the brakes.

Referring now to the modification shown in Fig. 5 it will be seen that the secondary passage 84 communicates with the chamber 78 instead of with the chamber 80, and that the chamber 80 communicates with the train-pipe through an opening 100, within which the check-valve 96 is located and held in its seat by means of a spring 104. In this example the pressure in the auxiliary reservoir over or below the strength of the spring 94 will obviously open and close the respective disks in substantially the same manner as referred to with reference to Fig. 1.

In both examples of my improvement, while the valve-disk 86 is open, the piston 8 remains moved into the chamber 4, cutting off communication between the chamber 4 and auxiliary reservoir, as in Fig. 2.

The action of this feeding or recharging device on a train would be as follows: Assume that from repeated quick stops or along downgrade, the pressure in the auxiliary reservoirs had been reduced to forty-five pounds and the engineer wished to recharge said reservoirs. At this pressure the diaphragm has the feeding-valve 86 open. The graduating-valve 28 in the triple slide-valve is closed, as in Fig. 2, isolating the air in the brake-cylinder. Now if the engineer admits air to his train-pipe it will flow directly to the auxiliary reservoir and continue to restore pressure therein until the pressure in the train-pipe overcomes the resistance of the spring 94 and closes the feeding-valve 86.

With reference to that part of the invention for equalizing the frictional bearing of the brake-shoes on the wheels relatively to the speed of a train while slackening, it is well known that the friction of brake-shoes on the wheel is reduced by an increased speed of a train. A pressure on the shoe at seventy miles an hour may be much greater without danger of sliding a wheel than at forty miles an hour.

68 indicates an exhaust-port leading from a portion of the passage 34, or otherwise communicating directly with the brake-cylinder. This exhaust-port has a restricted outlet and is controlled by a valve 70 held to its seat by means of a load or resistance. (Here shown as a spring 72.) The resistance of the valve 70 is such that the valve will remain closed when the braking pressure in the cylinder is such that it is suited to ordinary speeds. When the speed of a train is such that a greater pressure of the shoes is necessary, an increased pressure is applied in the brake-cylinder, and the valve 70 opens and allows a gradual escape of air in an approximately due proportion to the slackening speed, so that the pressure in the brake-cylinder is reduced to a normal amount after the speed has slackened, and the brake-shoes will not continue to be set too hard after the high speed has been thus reduced.

Having described my invention, what I claim is—

1. In an air brake, the combination with an auxiliary reservoir, a train pipe, a brake cylinder, and a triple valve having a charging passage for controlling communication between the auxiliary reservoir and brake cylinder, of a secondary feed passage, between the train pipe and the auxiliary reservoir, provided with a double seated charging valve, substantially as described, and a movable abutment connected thereto operated by the train pipe or reservoir pressure for the purpose specified.

2. In an air brake, the combination with an auxiliary reservoir, a train pipe and a brake cylinder, of a valve casing, a triple valve having a charging passage for controlling communication between the reservoir and brake cylinder, the said valve casing having a secondary passage providing communication between the reservoir and train pipe, a double seated valve for controlling said passage, a diaphragm and resistance spring having a connection therewith, adapted to open the same at a predetermined air pressure, but to close the same at a higher or lower pressure, substantially as and for the purpose specified.

HARRIS TABOR.

Witnesses:
CHAS. W. FORBES,
E. MACENTEE.